US006360921B1

(12) United States Patent
Boos et al.

(10) Patent No.: US 6,360,921 B1
(45) Date of Patent: Mar. 26, 2002

(54) BELLOWS-TYPE DISPENSING PUMP

(75) Inventors: Robert Boos, Donaueschingen; Uwe Müller, Dresden, both of (DE)

(73) Assignee: STEAG MicroTech GmbH (DE)

( * ) Notice: Subject to any disclaimer, the term of this patent is extended or adjusted under 35 U.S.C. 154(b) by 0 days.

(21) Appl. No.: 09/555,988

(22) PCT Filed: Nov. 18, 1998

(86) PCT No.: PCT/EP98/07401

§ 371 Date: Jun. 2, 2000

§ 102(e) Date: Jun. 2, 2000

(87) PCT Pub. No.: WO99/28232

PCT Pub. Date: Jun. 10, 1999

(30) Foreign Application Priority Data

Dec. 1, 1997 (DE) ........................................ 197 53 286

(51) Int. Cl.[7] .......................... G01F 11/00; F04B 35/04

(52) U.S. Cl. ....................... 222/386; 222/333; 222/152; 417/416

(58) Field of Search ................................ 222/386, 326, 222/333, 389, 251, 272, 152; 417/412, 416

(56) References Cited

U.S. PATENT DOCUMENTS 5,061,156 A * 10/1991 Kuehne et al. ............. 417/412
5,636,762 A * 6/1997 Juhola et al. .................. 222/1

* cited by examiner

*Primary Examiner*—Kevin Shaver
*Assistant Examiner*—Stephanie Willatt
(74) *Attorney, Agent, or Firm*—R. W. Becker & Associates; R. W. Becker

(57) ABSTRACT

An apparatus for discharging a liquid from a container is provided. A mobile unit is disposed in the container in such a way as to be movable therein in a contact-free manner for reducing the volume of the container. A bellows connects the mobile unit in a liquid-tight manner to an inner wall of the container. An interior chamber of the bellows that faces away from the container, together with a housing, form a space that is closed off against the exterior. A spindle, as a drive apparatus, is disposed in this space. The spindle is connected to the mobile unit in the interior chamber of the bellows.

13 Claims, 1 Drawing Sheet

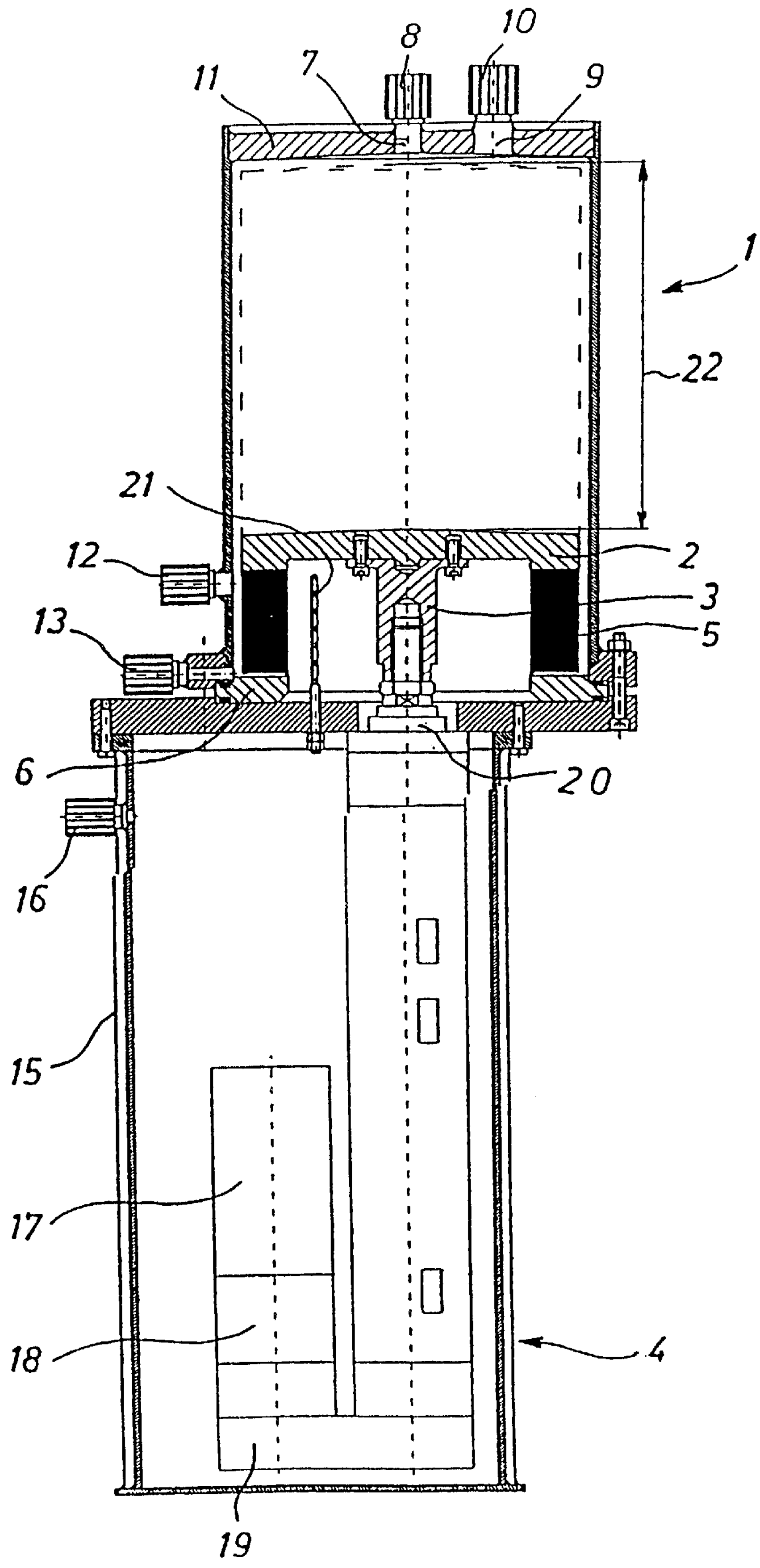
8
10
11
7
9
1
22
21
12
2
3
13
5
6
20
16
15
17
18
4
19

BELLOWS-TYPE DISPENSING PUMP

BACKGROUND OF THE INVENTION

The invention relates to an apparatus for discharging a liquid comprising a container containing the liquid and furthermore comprising a mobile element for reducing the volume of the container.

Apparatus of this type are known from, e.g., DE 42 19 161 A in connection with pumps in which the container or a hollow space is embodied in the shape of a cylinder in which a piston is caused to move for changing the container volume. The piston is sealed against the cylinder wall by means of a seal. Particles wear off due to the frictional forces between the seal and the interior cylinder wall, and these particles lead to contamination of the liquid that is to be discharged. This type of apparatus is therefore not suitable for discharging extremely pure liquids, e.g. chemicals or other liquids that are to be used for treatment or cleaning in the field of chip manufacturing when such treatment and cleaning require extremely pure media.

Known from U.S. Pat. No. 3,318,257, WO 96/10 534 A1, and U.S. Pat. No. 4,886,189 are pump arrangements in which diaphragms are provided for sealing the liquid container and for changing the container volume, and the position of diaphragms is changed by drive means that are either mechanical or hydraulic. It is not possible to discharge a liquid in a uniform, non-pulsing manner with these devices because it is not possible for them to have a uniform, non-pulsing change in the container volume. Therefore it is not possible for these apparatus to have uniform discharge at a constant volume per unit of time over a particular period of time.

Known from FR 13 82 439 is an apparatus in which a bellows constitutes the container containing the liquid. One disadvantage of this arrangement is that when there is a change in the bellows/container volume, the pressure that occurs in the bellows creates pressure on the surface of the bellows. Therefore, even when the travel motion is uniform, the volume and thus the discharge quantity of the liquid to be pumped is not uniform and constant across the entire range of travel.

The object of the invention is therefore to provide an apparatus that is constructed simply, avoids formation of particles during operation and thus avoids contaminating the liquid to be discharged, and makes it possible to discharge the liquid over the discharge period at a constant volume per unit of time.

SUMMARY OF THE INVENTION

This object is achieved in accordance with the invention with an apparatus for discharging a liquid comprising a container containing the liquid and furthermore comprising a mobile element for reducing the volume of the container, wherein the mobile element is movable in the container in a contact-free manner and is connected to an inner wall of the container in a liquid-tight manner, and the connection between the mobile element and the inner wall of the container is a bellows, the interior space oriented away from the container of which together with a housing constitute a space that is closed against the exterior and that contains a spindle for a drive apparatus that is connected in the interior space of the bellows to the mobile element.

Because one feature in accordance with the invention is the use of a bellows, the interior space of the container, in which the liquid to be discharged is located, is securely and reliably closed against the outside, even with respect to the mobile element, without limiting the mobility of the element for reducing the volume of the container and for generating the discharge pressure for the liquid. An essential advantage of this apparatus in accordance with the invention compared to conventional discharge apparatus, e.g. those that use pumps, is that no seal is necessary between the mobile element and the interior surface of the container. Frictional forces therefore do not occur between the mobile element and the container wall, so that no particles can be formed that could contaminate the liquid to be discharged that is contained in the container. In addition, the pressure to be exerted on the liquid to be discharged is substantially more uniform due to the fact that no uneven frictional forces occur. This results in the liquid being discharged in a substantially more uniform and pulsation-free manner.

The apparatus in accordance with the invention has significant advantages over diaphragm pumps, as well, since when using a bellows to connect the mobile element and an inner wall of the container independent of the container volume, that is, independent of the beginning or end of the pumping process, it is always possible to pump a constant volume per time unit since the container volume has a linear relationship to the movement of the mobile element and to the dimension of the drive for this element over the entire pumping process, in contrast to diaphragm pumps.

Although the mobile element during its movement can be in physical contact with the interior surface of the container, contact-free movement of the element in the container is particularly advantageous for reasons already cited because this avoids wear with certainty.

The mobile element is connected to a drive device in the bellows, characterized in the following as bellows. Since the bellows completely seals the interior of the container against the outside, no measures are required to protect the drive device from the liquid to be discharged. In conventional apparatus with sealing elements between the mobile element and the inner wall of the container, it is not possible to reliably prevent liquid from penetrating to the sealing elements even when the sealing elements are undamaged. The apparatus in accordance with the invention reliably avoids the difficulties and leaks that occur because of this, which are very disadvantageous, especially in the case of very aggressive or corrosive liquids. The drive device can therefore be more simple in its construction and can be produced with less expensive parts.

The drive device encompasses a mobile rod, preferably a servo-axis or a spindle, wherein this rod, servo-axis, or spindle can be constructed very simply and still permit very uniform linear movement at a very constant speed over the range of travel so that the liquid is discharged at a very constant volume per unit of time. A motor drives, moves or rotates the rod, servo-axis, or spindle.

Preferably the entire drive device is surrounded by a housing that preferably is attached to an exterior wall of the container, wherein the housing and the interior space of the bellows constitute a space that is closed against the outside. This design is not only simple in terms of construction as regards manufacturing and maintenance, but reliably protects the exterior space from a chemically aggressive environment as can be found in chemical facilities and in particular in facilities for treating and producing semiconductor chips. In order to protect the drive even better against external factors, the space formed by the housing for the drive device and the bellows is filled with an inert, neutral gas that can furthermore have an overpressure in order to reliably prevent aggressive vapors from being introduced into this space.

In accordance with an additional embodiment of the invention, arranged in the space formed between the housing and the bellows is a sensor that determines whether liquid to be discharged from the container travels into this space, e.g. when the bellows or connecting points between the bellows and the mobile element or the container wall leaks. In this case it is advantageous to arrange the sensor near the bellows. It is also possible, however, to provide a sensor alternatively or additionally in this space with which it can be determined whether gases have penetrated therein from outside.

Preferably the material from which the bellows is manufactured comprises a substance that is not affected by the liquid to be discharged.

The present invention is particularly suitable for use for conducting a liquid in a carrier stream. In this case it is very important that the liquid be introduced to the carrier stream in a very uniform manner.

The apparatus in accordance with the invention can be used advantageously in a facility for treating semiconductor substrates. This is because extremely pure liquids must be used and any contamination must be avoided that might occur, e.g. from the movement of seals between the mobile element and the inner wall of the container in conventional apparatus as a result of wear. This advantage is particularly desirable in connection with a uniform volume of liquid per unit of time over the period of discharge.

When the apparatus in accordance with the invention is used in connection with the treatment of semiconductor substrates during production of semiconductor chips, the liquid to be discharged is preferably hydrofluoric acid that is fed into a stream of distilled water, wherein both are then introduced into a treatment tank for rinsing and cleaning semiconductor substrates. In this case polytetrafluoroethylene (PTFE) is particularly suitable for the material for the bellows.

BRIEF DESCRIPTION OF THE DRAWINGS

The invention is described in more detail in the following with respect to a preferred exemplary embodiment using the single drawing.

DESCRIPTION OF PREFERRED EMBODIMENTS

The FIGURE illustrates a container 1 for a liquid to be discharged, e.g. hydrofluoric acid. The container is cylindrical in the exemplary embodiment illustrated. A mobile element 2, in this case a plate with a diameter that is smaller than the interior diameter of the cylindrical container 1, is connected via a connecting piece 3 to a drive device 4.

Located on the exterior circumference of the mobile element 12 is a bellows 5 that is connected liquid-tight on one side to the mobile element 2 and on the other side to the interior surface of a side wall 6 of the container 1. In accordance with a particularly advantageous embodiment of the invention, the mobile element 2 and the bellows 5 are integral or monolithic. The mobile element 2 and the bellows 5 are thus produced entirely from one PTFE workpiece. The bellows with cuts or notches which are offset from the exterior and from the interior, thereby producing the bellows function A discharge opening 7 with a discharge valve 8 and an intake opening 9 with an intake valve 10 are provided on the side wall 11 of the container 1 opposite the mobile element 2. Disposed in the side wall of the cylinder is a safety or overload connection or valve 12 and a vent connection or valve 13.

Attached from the outside to the side wall 6, through which the mobile element 2 is driven, is a housing 15 that surrounds the entire drive apparatus 4. The housing 15 together with the housing and the interior space formed by the mobile element 2 and bellows 5 constitute a common space that is closed against the exterior. However, this space communicates controllably with the exterior space by means of an inlet valve 16.

The drive apparatus has a motor 17, a planetary gearing 18, and a belt drive 19 that drive a real spindle 20 that is connected to the mobile element 2 via the connecting piece 3.

Arranged inside the space formed by the bellows 5 and the mobile element 2 is a fluid or gas sensor 21 that detects leaks in the bellows 5 when liquid that is to be discharged escapes.

When the spindle 20 collapses the bellows 5, the mobile element 2 is caused to move away from the outlet (the Figure shows the invention in a sectional view), and the liquid to be discharged is suctioned into the container 1 via the intake valve 10 and the intake opening 9. For discharging the liquid contained in the container 1, the spindle 20 is caused to move in the reverse direction in that the bellows 5 is expanded so that the mobile element 2 during travel indicated by the arrow 22 discharges the liquid through the discharge opening 7 and the discharge valve 8, which is now open. The mobile element 2 can be moved with the spindle 20 over a long period of time at a very uniform speed so that the discharge volume per unit of time across the discharge period remains very uniform and constant. The element 2 moving back and forth creates no frictional forces and thus does not result in the formation of particles because the mobile element 2 does not touch the interior surface of the container 1. The interior space of the container 1 is sealed against the outside by means of the bellows 5, which permits linear movement of the element 2 without the formation of particles.

The invention has been described using a preferred exemplary embodiment. However, one skilled in the art would be able to make use of numerous embodiments and modifications that would still involve the inventive idea. For instance, the attaching apparatus can also be realized in a manner other than that illustrated in the exemplary embodiment. The container 1 can also be square and the intake and discharge openings for the liquid to be discharged can also be arranged on the exterior circumference of the container 1.

The specification incorporates by reference the disclosure of German priority document 1979 53 286.1 of Dec. 1, 1997.

The present invention is, of course, in no way restricted to the specific disclosure of the specification and drawings, but also encompasses any Modifications within the scope of the appended claims.

What is claimed is:

1. An apparatus for discharging a liquid, comprising:

a container for containing liquid;

a mobile unit that is movable in said container in a contact-free manner for reducing the volume of said container;

a bellows for connecting said mobile unit in a liquid-tight manner to an inner wall of said container;

a housing, wherein an interior chamber of said bellows together with said housing, form a space that is closed off against the exterior; a spindle, as a drive apparatus, disposed in said space, wherein in said interior chamber of said bellows said spindle is connected to said mobile unit; and a leak sensor disposed in said interior chamber of said bellows.

2. An apparatus according to claim 1, wherein a motor is provided for driving said spindle.

3. An apparatus according to claim 2, wherein said motor is disposed within said closed off space.

4. An apparatus according to claim 1, wherein said closed off space is filled with a gas.

5. An apparatus according to claim 4, wherein said gas has an overpressure.

6. An apparatus according to claim 1, wherein said bellows is composed of a material that is not affected by said liquid that is to be discharged.

7. An apparatus according to claim 1, wherein said apparatus is used for introduction of said liquid that is to be discharged into a carrier stream.

8. An apparatus according to claim 1, wherein said apparatus is used in conjunction with a facility for treating semiconductor substrates.

9. An apparatus according to claim 1, wherein said liquid that is to be discharged is hydrofluoric acid.

10. An apparatus according to claim 1, wherein said bellows is made of polytetrafluoroethylene.

11. An apparatus for discharging a liquid, comprising:

a container for containing liquid;

a mobile unit that is movable in said container in a contact-free manner for reducing the volume of said container;

a bellows for connecting said mobile unit in a liquid-tight manner to an inner wall of said container;

a housing, wherein an interior chamber of said bellows together with said housing, form a space that is closed off against the exterior;

a spindle, as a drive apparatus, disposed in said space, wherein in said interior chamber of said bellows said spindle is connected to said mobile unit; and a motor for driving said spindle and disposed within said closed off space, said closed off space filled with a gas for protecting the spindle against the outer atmosphere.

12. An apparatus according to claim 12, wherein said gas has an overpressure.

13. An apparatus according to claim 12, wherein a leak sensor is disposed in said interior chamber of said bellows.

* * * * *

UNITED STATES PATENT AND TRADEMARK OFFICE

CERTIFICATE OF CORRECTION

PATENT NO. : 6,360,921 B1
DATED : March 26, 2002
INVENTOR(S) : Boos et al.

It is certified that error appears in the above-identified patent and that said Letters Patent is hereby corrected as shown below:

Column 6,
Claims 12 and 13 should read as follows:

Lines 20-21, -- 12. An apparatus according to claim 11, wherein said gas has an overpressure.
Lines 21-22, -- 13. An apparatus according to claim 11, wherein a leak sensor is disposed in said interior chamber of said bellows.

Signed and Sealed this

Third Day of September, 2002

*Attest:*

JAMES E. ROGAN

*Attesting Officer*

*Director of the United States Patent and Trademark Office*